March 3, 1936.   T. D. NATHAN   2,032,492
PIPE JOINT ASSEMBLY
Filed Oct. 31, 1934   2 Sheets-Sheet 1
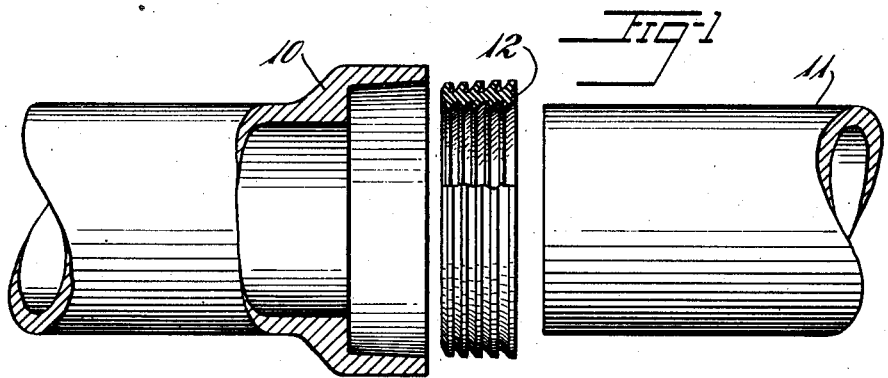
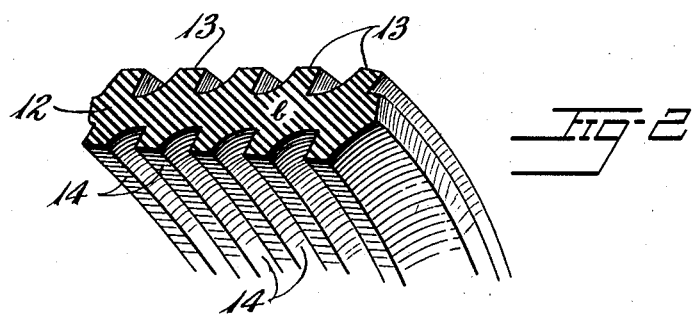
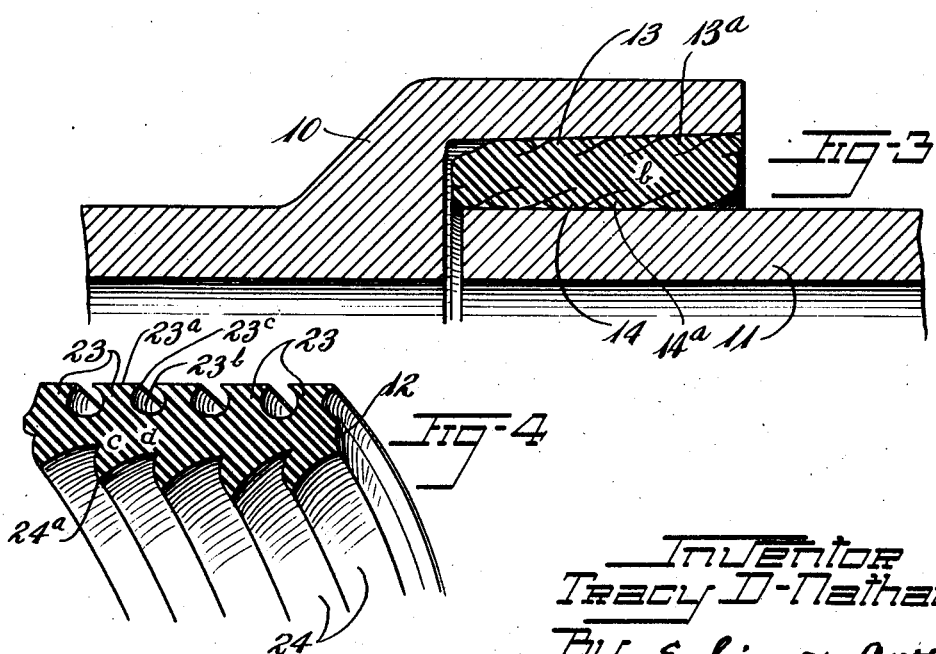
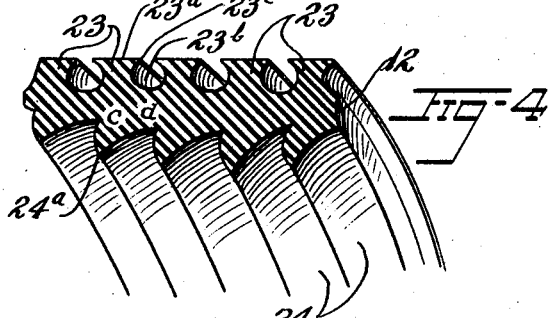
Inventor
Tracy D. Nathan
By Eakin & Avery
Attys.

March 3, 1936.  T. D. NATHAN  2,032,492
PIPE JOINT ASSEMBLY
Filed Oct. 31, 1934  2 Sheets-Sheet 2
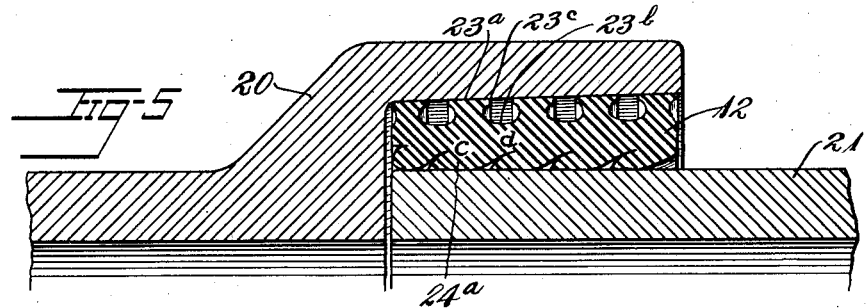
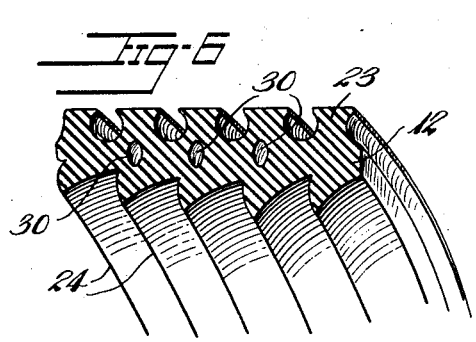
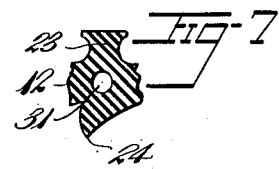
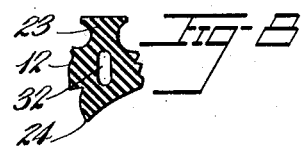
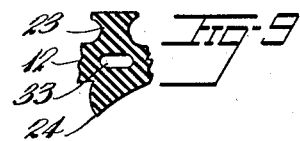
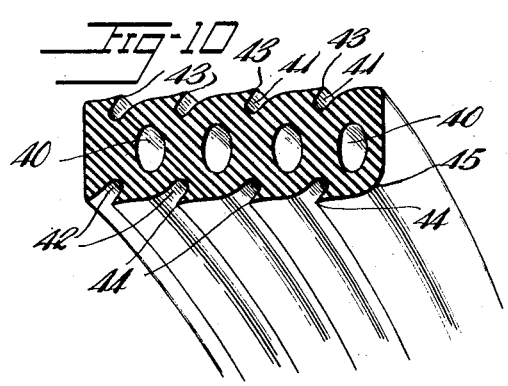
Inventor
Tracy D. Nathan
By Eskin & Avery
Attys.

Patented Mar. 3, 1936

2,032,492

UNITED STATES PATENT OFFICE 2,032,492

PIPE JOINT ASSEMBLY

Tracy D. Nathan, Akron, Ohio, assignor to The B. F. Goodrich Company, New York, N. Y., a corporation of New York Application October 31, 1934, Serial No. 750,844

4 Claims. (Cl. 285—90)

This invention relates to pipe joint assemblies, especially assemblies of terra cotta and other ceramic pipes which are comparatively fragile and are used for conducting fluids at low pressures.

Joints for such pipes have been packed heretofore with cement or with bituminous material, which have been non-resilient and upon hardening have been too rigid to cushion relative movement of the pipe sections under soil movement or vibration satisfactorily. This has resulted often in leaky joints and cracked and even broken pipes.

Moreover, such joints often have been ineffective to resist axial separation of the pipe sections under the "line pull" of soil movements; and the assembling of such joints has required considerable care, skill and time. Considerable equipment for pouring, heating and tamping has been required. Where the joints have been made in water or silt, special precautions have been necessary to exclude such substances during the making of the joint.

In some localities, difficulty has been encountered also with tree roots which have found their way in hair-like form into minute crevices of the pipe joint and, on getting access to water from the pipe, have proceeded to grow and burst the joint and pipe.

The chief objects of this invention are to provide an improved joint, avoiding the above-discussed difficulties; to provide a joint utilizing rubber effectively to seal, to cushion and to resist pipe separation without, however, stressing the pipe sections excessively; and to provide for assembling the joint quickly and conveniently by manual power without special skill and without requiring tools or other equipment for the operation.

These and further objects will be apparent from the following description, reference being had to the accompanying drawings, in which:

Fig. 1 is an elevation, with parts sectioned, of a pair of separated pipe sections and a rubber sealing ring constructed according to and embodying the invention in a preferred form.

Fig. 2 is a section on a larger scale of the sealing ring of Fig. 1.

Fig. 3 is a longitudinal section of the joint assembly.

Figs. 4 and 5 are views like Figs. 2 and 3, respectively, but showing a modified construction.

Figs. 6 to 10 are views like Fig. 2 but showing, respectively, further modified constructions, Figs. 7, 8 and 9 being fragmentary views.

Referring to Figs. 1 to 3, the improved joint is illustrated as made with ordinary bell and spigot pipe sections 10 and 11, which may be of such fragile material as clay formed according to any of the usual ceramic processes. Other forms of pipe sections than the bell and spigot type may be used, if desired.

In the annular space between the pipe sections is interposed a rubber sealing ring 12, which, according to the invention, is formed and mounted in a manner effective for fluid-sealing and for resisting "line pull" of the pipe sections, without, however, exerting a high radial pressure against the pipe walls. The rubber ring comprises at its radially inner and outer faces a plurality of circumferentially extending ridges 13, 13 and 14, 14, respectively, of such size, shape and disposition as to be effective, upon assembly by a simple telescoping movement with the pipe members, to seal by pressure of the ridges in a flexed condition against the walls of the pipe members, as shown in Fig. 3. The ridges are flexed in the proper axial direction by which their resistance to the assembly movement is the lesser, and their resistance to pipe movement in the opposite axial direction is the greater by virtue of their tendency under the frictional drag to be swung more tightly against the pipe wall. To facilitate this the ridges in the unstressed condition of the ring are preferably inclined somewhat in the proper direction as shown in Figs. 1 and 2. The grooves between the ridges are sufficiently wide to permit considerable flexure of the ridges, and each ridge preferably is generously wide at its base so as to make available ample resilience of the rubber for effectively sealing by flexure of the ridges, but without such radial compression of the ring body as might set up a pressure too great for the fragile material of the pipes.

Preferably also, the ridges of each face of the ring are disposed with relation to the ridges at the other face so that they cooperate with each other to augment the resistance to pipe separation by a "moving strut" action. Considering the region of a pair of ridges 13a and 14a, the two ridges and the interconnecting rubber constitute an obliquely disposed element which tends to be swung more nearly erect at the start of any relative separating movement of the pipes, this action resulting from the frictional drag exerted by the pipe member 10 against the ridge 13a to the left, causing that ridge to tend to swing counter-clockwise and, by transmission of the force tangentially of the center b, to assist the ridge 14a also to swing counter-clockwise and increase the effectiveness of the toggle to resist separation. Similarly, a drag to the right of the pipe 11 against ridge 14a causes the latter to assist ridge 13a in counter-clockwise swinging, the two ridges cooperating with each other to increase their effectiveness to resist pipe separation.

The assembly operation may be effected simply by inserting the rubber ring into the bell section 10 and then pressing in the spigot section 11 manually, no tools or equipment being necessary. As no pouring of a cement or a bituminous substance or tamping of a packing is done, it is not necessary to make special arrangements where the assembly is to be effected in or under water.

In the modification of Figs. 4 and 5, two pipe members 20 and 21 are sealed by a rubber ring 12 which at its outer face is grooved to provide flat and radially erect ridges 23, 23 and at its inner face is formed with obliquely disposed ridges 24, 24. In this embodiment also a toggle-like action is provided, the obliquely disposed ridge 24a, for example, being assisted in its counter-clockwise swinging when the pipe 21 tends to drag it to the right by the fact that at its left hand side, in the region c, the ridge 23a provides a radially extending zone of rubber under some compression which is available to assist the counter-clockwise swinging, while at its right hand side, in the region d, any radial pressure that might oppose the counter-clockwise swinging of the ridge 24a is relieved by the groove 23b.

Each groove between the flat-topped ridges 23, 23 preferably is of such form as to provide an edged lip 23c, which fits closely against the pipe wall, and, upon start of movement of the pipe 20 to the left (Fig. 5), increases the binding action by the tendency of the ridge to be swung counter-clockwise.

The obliquely disposed ridges also may be formed with edges adapted to increase the gripping or binding action of the rubber against the pipe wall. Such edge may be provided by a tapered form of the ridge, terminating in an edge as shown in Fig. 4, or terminating in a flat, edged end as shown in Fig. 2. In order that the edge may be most effectively pressed against the pipe wall, the adjacent pipe-contacting face of the ridge preferably is formed concave, as shown in Figs. 2 and 4.

As standard bell pipe sections are ordinarily formed with slightly conical inner faces, tapering axially away from the mouth, the rubber ring preferably is formed with a corresponding taper, as shown in Figs. 2 and 4, so that the pressure of the rubber against the pipe wall will be substantially uniform along its axial extent.

In some installations of the more inexpensive sort, where little or no pressure of the conducted fluid is encountered, pipe sections are used which are often out of round and present considerable variations in the radial depth of the annular spaces between the bell sections and their respective spigots. It is desirable here to have a gasket that is very softly resilient so as to be adaptable effectively to annular spaces of varying radial depths. Mere softness of the rubber composition is not wholly satisfactory because it is usually desired that the composition include ingredients to increase its life and its resistance to corrosion, which of necessity increase the stiffness of the composition, and a very nearly pure rubber for the sake of softness ordinarily would be prohibitively expensive for this use.

Referring to Fig. 6, such increased softness is provided by circumferentially extending apertures 30, 30 formed in the rubber body at the zones where it would otherwise present the greatest resistance to radial compression, that is to say in the zone of the ridges. The gasket of Fig. 6 is otherwise like that of Figs. 4 and 5, and the action of resisting pipe separation, as well as the sealing action, hereinbefore described is present in this form also, although reduced in degree because of the lesser pressure on the rubber.

The apertures may be oval in cross section as shown in Fig. 6, or circular as shown at 31 in Fig. 7, or approximately rectangular, either radially extending as at 32 in Fig. 8, or axially extending as at 33 in Fig. 9. Other shapes of the apertures may be provided, if desired.

For greater softness, the apertures may be formed larger as at 40, 40 in the embodiment of Fig. 10. Still greater softness may be provided along with effective sealing by grooves 41, 41 and 42, 42 on the two faces of the gasket in the zones between the apertures 40, 40, so that the gasket will have the desired degree of softness all along its length. The resistance to separation of the pipe sections under "line pull" may be increased by the provision of outwardly tapering and inclined ridges between the grooves having edges 43, 43 and 44, 44 engageable with the pipe surfaces.

This gasket, as in the case of the embodiments hereinbefore described, is mounted preferably by positioning it in the bell section and then shoving in the spigot section, and for the purpose of facilitating the insertion of the spigot section the gasket preferably is rounded at 45, the margin first contacted by the spigot section.

I claim:

1. A fluid-seal pipe joint assembly comprising inner and outer pipe members defining between them an annular space and, mounted in said space, a rubber sealing ring having circumferentially extending flanges at the inner and outer faces thereof held pressed against the walls of said space, the ring body being apertured in its interior.

2. A fluid-seal pipe joint as defined in claim 1 in which the ring body has circumferentially extending apertures in its interior radially in line with the said flanges.

3. A fluid-seal pipe-joint assembly comprising a male member, a female member surrounding the male member and therewith defining an annular space and, mounted in the annular space between the two, a resilient sealing gasket formed on one of its faces with flanges inclined in such direction as to act as pawls under the force of the fluid-pressure upon the gasket as a whole and on its other face with flanged inclined in such direction as to act as lip-sealing members under the force of the fluid-pressure upon them.

4. A fluid-seal pipe-joint assembly comprising a male member, a female member surrounding the male member and therewith defining an annular space and, mounted in the annular space between the two, a resilient gasket having one end thereof exposed to the fluid-pressure, the gasket being formed with annular flanges on its inner and outer faces and the flanges on at least one of its faces being inclined in such direction as to act as pawls under the force of the fluid-pressure upon the gasket as a whole.

TRACY D. NATHAN.